United States Patent

[11] 3,607,416

| [72] | Inventors | John H. Sizer, Jr. <br> Vernon, Conn.; <br> Jose D. Giner, Sudbury, Mass. |
|---|---|---|
| [21] | Appl. No. | 617,073 |
| [22] | Filed | Feb. 20, 1967 |
| [45] | Patented | Sept. 21, 1971 |
| [73] | Assignee | United Aircraft Corporation <br> East Hartford, Conn. |

[54] SPINEL-TYPE ELECTRODES, PROCESS OF MAKING AND FUEL CELL
14 Claims, No Drawings

[52] U.S. Cl. ................................................. 136/86, 136/120, 148/6.3, 117/230
[51] Int. Cl. ....................................................... H01m 27/00, H01m 27/04, C23c 3/04
[50] Field of Search .......................................... 136/120 FC, 86, 24, 28, 29, 120; 252/519, 62.51; 148/6.3; 117/230; 106/39

[56] References Cited
UNITED STATES PATENTS

| 2,716,670 | 8/1955 | Bacon .......................... | 136/86 |
| 3,393,099 | 7/1968 | Giner et al. .................... | 136/86 |

FOREIGN PATENTS

| 713,150 | 7/1965 | Canada ........................ | 136/120 |
| 1,014,587 | 12/1965 | Great Britain ................. | 136/120 FC |

Primary Examiner—Winston A. Douglas
Assistant Examiner—M. J. Andrews
Attorney—Finnegan, Henderson & Farabow ABSTRACT: A process of forming a fuel cell electrode comprised of a nickel oxide-cobalt oxide spinel surface is disclosed. The process consists of first forming a nickel oxide layer on a substrate, then impregnating it with a solution of a cobalt salt and subsequently oxidizing the impregnated substrate to form the mixed oxide spinel-type electrode.

SPINEL-TYPE ELECTRODES, PROCESS OF MAKING AND FUEL CELL

This invention relates to fuel cell electrodes, and more particularly to a process for producing fuel cell electrodes having a protective oxide surface layer, and to the improved electrodes produced by this process.

In the operation of fuel cells, the cathode or oxygen electrode of the cell is itself continuously oxidized, producing a number of operational problems. For example, the buildup of oxide on the electrode tends to block the pore structure of the electrode and also reduces its effective surface area. The blockage of the pore structure obstructs the flow of gas reactants through the electrodes to the reaction sites in, or at the surface of, the electrode; and the reduction in electrode surface area reduces the sites at which these reactions can occur. Both of these results of electrode oxidation, of course, reduce cell performance and efficiency.

Oxidation of the cathode during cell operation also adversely affects the structural integrity of the electrode which, if continued long enough, can bring about an eventual catastrophic failure of conventional sintered or felt metal electrode structures.

Past attempts to improve the performance characteristics of fuel cells by reducing the adverse effect of electrode oxidation during cell operation have proceeded along two lines. First, attempts have been made to increase the initial performance levels of the electrodes by various procedures. Although high initial performance levels have been achieved, it has been found that these performance levels fall off rapidly during cell operation, rendering the system highly unstable and hence unsatisfactory.

Secondly, attempts have been made to improve the operational stability of fuel cell electrodes, so that electrode performance remains relatively constant over the period of operation of the cell. To achieve this stability of operation, it has been necessary, in the past, to sacrifice high performance levels in the electrodes.

Accordingly, it is the primary object of this invention to provide the new and improved process for the production of fuel cell electrodes which have both high initial performance levels and improved stability of operation.

Another object of this invention is to provide an improved process for the production of oxidation-resistant fuel cell electrodes which, by virtue of their excellent resistance to oxidation, maintain improved operational stability and structural integrity during cell operation.

Still another object of this invention is to provide a process for the production of fuel cell electrodes having an oxidation-protective surface layer which does not adversely affect the high initial performance of the electrodes, and which prolongs the operating life of the electrodes, and improves their operational stability fuel cell operation.

A still further object of this invention is to provide an improved porous fuel cell electrode which has high initial performance levels during prolonged cell operation.

Additional objects and advantages of this invention will be set forth in part in the description which follows, and in part will be obvious from the description, or may be learned by the practice of the invention, the objects and advantages being realized and attained by means of the methods, processes, products, combinations, and improvements particularly pointed out in the appended claims.

To achieve the foregoing objects and in accordance with its purposes, as embodied and broadly described, the process of this invention comprises oxidizing a porous nickel fuel cell electrode at a temperature between about 500° and 800° C. to produce a uniform oxide layer on the surface of the electrode, impregnating the oxidized electrode with solution of a cobalt salt, and subsequently oxidizing the cobalt impregnated electrode at a temperature between about 250° and 550° C. This process produces a nickel oxide-cobalt oxide spinel-type surface layer on the electrode which affords good oxidation resistance and does not adversely affect high initial performance levels of the electrode.

It is to be understood that the term "electrode surface" includes the entire available surface area of the electrode including all surfaces within the pores of the electrode, and is not limited to the outer geometric surface area of the electrode unless specifically limited.

The invention lies in the novel methods, processes, articles, products and improvements described herein. It is to be understood that both the foregoing general description and the following detailed description are exemplary and explanatory but are not restrictive of the invention.

In accordance with the invention, a porous nickel electrode is subjected to a double oxidation treatment process, in which it is impregnated with a cobalt salt between the first and second oxidation steps. The combination of this double oxidation treatment with the cobalt impregnation step produces the improved electrodes of this invention.

The porous nickel electrode treated in accordance with the present process can be any conventional sintered nickel powder or nickel metal felt electrode. The electrode should be constructed of high purity nickel comprising at least about 99 percent by weight of nickel, with up to about 1 percent cobalt impurities. The electrode is preferably a biporous sintered nickel powder electrode, although single porosity electrodes can also be treated in accordance to the process of this invention. The porous sintered powder or metal felt base of the electrodes affords the necessary absorptive power so that the electrode can receive the impregnating agents applied to the base in the present process.

The porous nickel electrode substrate can be initially oxidized in a "green" condition, or it can be impregnated with a lithium salt prior to the first oxidation step of the process. The term "green" is used to indicate that the porous electrode substrate has not been impregnated or otherwise treated with lithium or another analogous activating substance prior to the oxidation. Thus the term "green" is used synonymously with the term "untreated." While it is preferred to initially impregnate the porous nickel structure with a lithium salt to activate the base, the improved electrodes of this invention are achieved regardless of whether this initial lithium activation step is used.

If the lithium impregnation step is used, a lithium salt, preferably lithium nitrate ($LiNO_3$) or lithium hydroxide (LiOH), in the form of an aqueous or alcoholic solution is used to completely impregnate the porous nickel substrate. The solution can contain up to about 20 percent by weight of lithium (measured as LiOH), and advantageously contains about 10 to 20 percent weight of lithium. An optimum concentration has been found to be about 16 percent by weight of lithium (as LiOH). Any suitable alcohol, such as methanol or ethanol can be used to make alcoholic lithium solutions.

The lithium activating solution can be applied to the porous nickel substrate by any suitable means such as by dipping, soaking, spraying or brushing the solution onto the substrate, or the like. The substrate should be well saturated with the lithium solution, so that it is completely impregnated.

The amount of lithium salt added to the electrode can be varied by varying the concentration of the lithium solution used in the impregnation step within the limits set forth above. The amount of lithium salt added to the electrode can be suitably determined by weighing the porous structure before and after impregnation.

After the lithium impregnation step is completed, excess impregnating solution is allowed to drain from the porous structure, and the electrode is then preferably dried either at room temperature or elevated temperature up to about 180° C., and preferably at about 95° C. The drying should not be carried out too rapidly, particularly in the case of biporous electrodes because the evaporation of steam from the porous structure at a rapid rate may weaken the juncture between the fine and coarse pore layers of the electrode.

In the first oxidation step of the present process, the lithium treated, or green, untreated porous nickel electrode is heated in the presence of air or oxygen at a temperature of about 500° to 800° C., and preferably at about 650° C., to produce a uniform oxide coating on the surface of the electrode. This oxidative heating can be carried out in any conventional atmospheric or draft furnace, and the use of a controlled atmosphere is not necessary—although the heating, of course, can be carried out in the presence of pure oxygen, if desired.

The length of time to which the porous electrode is subjected to the first oxidation is not critical, and is generally adjusted to facilitate large-scale production processes. Thus the oxidation step is regulated by the temperature used so that it can be completed in any convenient period of time, such as about 1 hour. Any time periods from about 20 to about 2 hours or more can be used for this first oxidation step. Of course, as longer oxidation times are used, lower oxidation temperatures are required.

The presence of lithium salt in electrodes which have been activated with the lithium solution slightly inhibits oxide formation. For this reason, oxidation temperatures about 50° C. higher than those used to oxidize green electrode substrates should be used in the first oxidation step when lithium activated substrates are used. The broad range of oxidation temperatures which can be used in the first oxidation step (500°–800° C.) is the same whether a green substrate or lithium activated substrate is being treated.

Sufficient oxide formation is effected in the first oxidation treatment step to give the porous nickel electrode an oxide content of at least about 5 percent weight. The term "oxide content" is used to indicate the percent of nickel by weight which is converted to nickel oxide during the oxidation step. Although up to 40 percent or more of the nickel in the electrode can be converted to nickel oxide in the first oxidation step, the conversion of more than about 30 percent of the nickel to nickel oxide appears to afford no additional advantage. In accordance with the invention, sufficient oxidation in the first oxidation step to produce a porous electrode having a nickel oxide content of about 15 to 30 percent by weight is preferred.

After the first oxidation step of the present process is completed, the oxidized porous electrode is impregnated with a cobalt salt. Although any ionizable cobalt salt, including cobalt chloride ($CoCl_2$), cobalt sulfate ($CoCO_4$), cobalt hydroxide [or the like can be used, cobalt nitrate [$Co(NO_3)_2$] is greatly preferred and appears to afford more improved results than can be achieved using other cobalt salts.

The previously oxidized, porous electrode structure is completely impregnated with the cobalt solution, by spraying, brushing or by any other suitable techniques. The electrode is preferably dipped or soaked in a cobalt nitrate solution. The cobalt solution used in this impregnation step is an aqueous or an alcoholic solution, and contains about 3 to 15 percent by weight of cobalt (as $Co^{++}$ ions). The solution preferably contains about 5 to 10 percent by weight of cobalt, and an optimum concentration is about 7 percent by weight.

After the cobalt impregnation step is completed, the electrode is again allowed to drain, and is then again dried either at room temperature or at elevated temperatures up to about 180° C., and preferably at about 95° C. Again, rapid evaporation of steam is avoided in the drying step to prevent weakening of the electrode structure, particularly in the case of biporous electrodes.

In accordance with the process of this invention, the porous electrode is subjected to a second oxidation step following the impregnation of the electrode with the cobalt solution. The second oxidation step is suitably carried out at a temperature of about 250°–550° C. in a conventional atmospheric or draft furnace. This oxidation step can also be carried out in the presence of either air or pure oxygen, as desired, although a controlled atmosphere is not necessary.

The second oxidation step is preferably carried out at a temperature of about 500° C. Theoretically, cobalt nitrate decomposes by pyrolysis at about 150° C., and such a temperature should be sufficient for the second oxidation step of the present process. In practice, however, it has been found that a temperature of at least about 250° C., is necessary to produce electrodes having the desired beneficial characteristics.

The second oxidation step of this process achieves two primary purposes. It forms an oxidation-resistant nickel oxide-cobalt oxide spinel-type material on the surface of the electrode, and it heals imperfections present in the first oxide coating and thereby prevents corrosion of the substrate.

It is to be appreciated that the term "spinel" is used herein in a broad sense to mean an oxide coating which is an intimate mixture of the two oxides. The particular "spinel" surface layer formed on the electrode by the second oxidation step of the present is a nickel oxide-cobalt oxide spinel-type material represented by the formula $Ni \cdot Co_2O_3$.

Rapid formation of the spinel-type surface layer is beneficial in achieving the desired oxidation resistance in the electrodes produced by the present process, and hence the preferred temperature (500° C.) used in the second oxidation step is near the upper limit of the operative range of temperatures (250°–550° C).

Again in the second oxidation step, the time during which the oxidation is carried out is not critical, and can be adjusted to comport with mass production procedures. Thus, the second oxidation step can be carried out from about 20 minutes to about 2 hours or longer, and is preferably carried out for about 1 to 2 hours at the preferred oxidation temperature 500° C. If an oxidation temperature of about 250° C. is used, the oxidation is preferably carried out for about 2 hours.

Although the second oxidation step can be carried out for a period longer than 2 hours, no additional benefits are generally conferred by this additional treatment time, and if the oxidation is carried out for longer periods, such as about 4 hours or more at temperatures in the upper portion of the operative temperature range, undesirable reduction of the surface area of the electrode can result.

The nickel oxide content of the electrode is increased only slightly in the second oxidation step of the present process. Thus, only up to about 5 percent additional nickel and usually only about 2 to 4 percent additional nickel is converted to nickel oxide in this second oxidation step.

It is possible, by using very low oxidation temperatures and short oxidation times in the second oxidation step, to merely convert the cobalt applied to the electrode in the impregnation step to cobalt oxide, without converting any additional nickel to nickel oxide. However, when the preferred second oxidation temperature of 500° C. is used, an additional 2 to 4 percent of the nickel generally will be converted to nickel oxide.

The electrodes produced by the process of the present invention are designed for use as cathodes or oxygen electrodes of conventional fuel cells operating on alkaline electrolytes. The electrodes can be single porosity or biporous structures. These electrodes are primarily useful in intermediate temperature fuel cells, such as Bacon-type cells which operate at temperature of about 150 to 300° C. The conventional alkaline electrolytes which can be used with the electrodes of this invention include alkali metal hydroxides, alkanolamines, and the like.

In summary, the process of this invention is designed to produce fuel cell electrodes having improved oxidation resistance, improved stability of operation, and high initial performance levels. These improved electrodes are provided by a double oxidation procedure which includes an impregnation of the electrode structure with a cobalt salt, preferably cobalt nitrate, between the two oxidation steps.

The first oxidation step can be carried out on a green or untreated porous nickel substrate, or the substrate can be activated by impregnating it with lithium prior to the first oxidation step. The present process produces an electrode having a uniform cobalt oxide-nickel oxide spinel-type surface layer which achieves high initial performance levels in the electrodes and also improves their oxidation resistance, thereby improving the stability of operation of the electrodes and prolonging their operating life.

For a clear understanding of the invention, specific examples illustrating it are set forth below. These examples are merely illustrative and are not to be understood as limiting the scope and underlying principles of the invention in any way.

The porous nickel substrate used in each of these examples is a biporous, sintered structure prepared from Inco B and/or D powder. The coarse layer of the biporous electrode is 40 to 50 percent porous, with a pore size of 4–7µ. The fine pore layer of the biporous electrode is 40 percent porous and has a pore size of 2–4µ.

Example 1

A biporous, sintered nickel powder electrode is impregnated with an aqueous solution of lithium nitrate which contains 16 percent by weight of lithium (LiOH) by dipping the porous nickel structure in the lithium nitrate solution until it is completely impregnated. The electrode is removed from the solution, drained, and dried in air at 95° C.

The lithium impregnated electrode is heated in air at 675° C. for 20 minutes to produce a nickel oxide surface layer on the electrode, and is then impregnated with an aqueous solution of cobalt nitrate containing 7 percent weight of cobalt (as Co).

The cobalt impregnation is carried out by dipping the oxidized electrode in the cobalt solution, until the electrode is completely impregnated. The cobalt impregnated electrode is removed from the solution, drained, dried in air at 95° C. and then reheated in air a second time at a temperature of 500° C. for 30 minutes of additional oxidation.

Analysis of the electrode following each oxidation step of the process indicates that 24.3 percent by weight of the nickel of the electrode is converted to nickel oxide in the first oxidation step, and an additional 2.7 percent by weight of the nickel is converted to nickel oxide in the second oxidation step, giving the final electrode product a total nickel oxide content of 27 percent by weight.

The biporous electrode produced in this example is used as the cathode of a conventional Bacon-type fuel cell operating at 230° C. and a cell voltage 0.9 volts, using an 85 percent potassium hydroxide electrolyte. The cell continues to operate at a cell voltage of 0.9 volts for over 200 hours of continuous operation without degradation of the structure of the electrode.

Example 2

In this example a biporous, sintered nickel electrode is treated by the same procedure used in example 1, except that the first oxidation step is carried out at a temperature of 600° C. for a period of 30 minutes, and the secured oxidation step is carried out at a temperature of 500° C. for 2 hours.

Analysis of the electrode following each oxidation step shows that 11 percent weight of the nickel in the electrode is converted to nickel oxide in the first oxidation step, and an additional 3.7 percent by weight of the nickel is oxidized in the second oxidation step, giving the final electrode product a total nickel oxide content of 14.7 percent by weight. The electrode produced in this example shows no decay in performance during 200 hours of continuous operation in a Bacon-type fuel cell utilizing an 89 percent KOH electrolyte and operating at a temperature of 230° C. and a cell voltage of 0.9 volts.

Example 3

A green biporous nickel electrode is oxidized in air at a temperature of 620° C. for 25 minutes. Analysis of the electrode after this first oxidation step shows that 22.6 percent of the nickel in the electrode is converted to nickel oxide.

The oxidized electrode is then impregnated with a 7 percent by weight aqueous solution of cobalt nitrate, by dipping the oxidized electrode in the cobalt solution and soaking it until impregnation is complete. The cobalt impregnated electrode is then drained and dried in air 95° C.

The electrode is subjected to a second oxidation step by heating it in air at a temperature of 500° C. for 1½ hours. An additional 3.1 percent by weight of the nickel in the electrode is converted to nickel oxide in this second oxidation step, and the final electrode product has nickel oxide content of 25.7 percent by weight.

The electrode produced in this example is operated in a Bacon-type fuel cell under the same conditions described in examples 1 and 2, and shows no decay in performance in 200 hours of continuous operation.

Examples 4–9

These examples illustrate the improved cell performance resulting from the double oxidation step of the present process.

Six electrode samples are prepared in the manner described below and each is operated as the cell cathode of a Bacon-type fuel cell for 200 hours of continuous cell operation at a cell voltage of 0.9 volts. The fuel cell uses an 85 percent potassium hydroxide solution as the electrolyte and operates at a temperature 230° C.

The electrode example of 4 is prepared by the same general procedure used in example 1. The first oxidation step is carried out at 675° C. for 20 minutes, and converts 37 percent by weight of the nickel in the electrode to nickel oxide. The second oxidation step, following the cobalt impregnation, is carried out at 500° C. for 60 minutes, and increases the final oxide content of the electrode to 41 percent by weight.

The electrodes of examples 5 and 6 are both produced by the same processes as used in example 1, and both of these electrodes have a final nickel oxide content 27 percent by weight.

The electrode of example 7 is produced by the same process used in example 2, and has a final nickel oxide content of 15 percent weight.

The electrodes of examples 8 and 9 are produced for comparative purposes by a single oxidation process. In this process the sintered, biporous nickel electrodes are uniformly impregnated with the cobalt impregnating solution used in example 1, and then oxidized in air in a conventional draft furnace. The electrode of example 8 is oxidized at 500° C. for 120 minutes to produce a final electrode product having a nickel oxide content of 28.8 percent by weight. The electrode of Example 9 is oxidized at a temperature of 500° C. for 60 minutes to produce a final electrode product having nickel oxide content of 14.6 percent by weight.

Table 1 compares the cell performance, as shown by the current destiny, of fuel cells utilizing the electrodes produced in examples 4–9 as their cathodes. The current density is measured in milliamps per cm² of geometric electrode surface area. Table 1 also compares the rates of oxidation of the electrodes produced in these examples during operation in the cells over the 200-hour test period.

TABLE 1

| Electrode | Current density at start of test, ma./cm.² | Current density after 200 hours, ma./cm.² | Initial oxide content, mg. Ni | | Oxidation rate, mg. Ni converted NiO/hr. of test |
|---|---|---|---|---|---|
| | | | As NiO | Percent | |
| Example: | | | | | |
| 4 | 275 | 275 | 2,690 | (41) | 0.7 |
| 5 | 275 | 275 | 1,780 | (27) | 0.4 |
| 6 | 275 | 275 | 1,770 | (27) | 0.7 |
| 7 | 275 | 275 | 970 | (15) | 1.5 |
| 8 | 275 | 240 | 1,870 | (28.8) | 4.4 |
| 9 | 275 | 245 | 950 | (14.6) | 6.7 |

The data set forth in table 1 clearly illustrates the improved electrode performance and oxidation resistance resulting from the double oxidation process of the present invention. No decrease in current density occurred over the 200-hour test period in the tests using the double oxidized electrodes of examples 4–7. By contrast, significant deterioration in current density is evidenced in both of the electrodes produced by the single oxidation processes of examples 8 and 9. Further, the electrodes produced by the single oxidation processes are oxidized at a much more rapid rate than those produced by the double oxidation processes of examples 4–7.

Examples 10–29

Twenty (20) electrodes are prepared for comparison of the double oxidation techniques of the present invention with prior art single oxidation techniques.

Ten (10) of the samples are prepared by the procedure described in example 1 with the first oxidation step being carried out on a lithiated porous nickel substrate, and the oxidized substrate then being impregnated with cobalt nitrate and again oxidized. The initial oxidation of these ten (10) samples, designated examples 10–19 in table 2, is carried out at 600°–675° C. and the second oxidation is carried out at 500° C. The oxidation steps are carried out for varying lengths of time to achieve different levels of oxidation in the resulting electrodes. The amount of nickel oxide present in each electrode after the double oxidation procedure, i.e., at the beginning of the testing, is shown in table 2.

Ten (10) additional electrodes, designated examples 20–29, are prepared by a single oxidation process in which the sintered porous nickel electrodes are first impregnated with the cobalt nitrate solution used in example 1, and then oxidized at 500° C. for varying amounts of time to produce a range of nickel oxide contents in the electrodes comparable to those introduced into the first (10) test electrodes.

All twenty (20) test electrodes are then inserted as cell cathodes in Bacon-type fuel cells operating at 235° C. and using an 85 percent by weight solution of potassium hydroxide as their electrolyte. The fuel cells are operated at a voltage of 0.9 volts for 200–300 hours. The rate of additional oxidation of the electrodes during the test period is shown in tables 2 and 3, respectively, for the double oxidized electrodes of examples 10–19 and single oxidized electrodes of examples 20–29.

The data in tables 2 and 3 clearly indicates that the double oxidation procedure of the present invention reduces the rate of electrode oxidation during cell operation by a factor of greater than 3, regardless of the level of oxidation introduced into the electrodes before they are operated in the fuel cell.

TABLE 2

| Example Number | Oxide Content at Start of Test mg. Ni as NiO | Rate of Oxidation mg. Ni Converted to NiO/hr. |
|---|---|---|
| 10 | 880 | 1.7 |
| 11 | 970 | 1.5 |
| 12 | 1,100 | 1.4 |
| 13 | 1,210 | 2.1 |
| 14 | 1,580 | 1.0 |
| 15 | 1,650 | 1.7 |
| 16 | 1,690 | 1.4 |
| 17 | 1,810 | 0.9 |
| 18 | 1,890 | 0.8 |
| 19 | 2,060 | 1.1 |

TABLE 3

| Example Number | Oxide Content at Start of Test mg. Ni as NiO | Rate of Oxidation mg. Ni Converted to NiO/hr. |
|---|---|---|
| 20 | 990 | 5.3 |
| 21 | 1,010 | 5.5 |
| 22 | 1,070 | 5.7 |
| 23 | 1,340 | 5.1 |
| 24 | 1,360 | 4.4 |
| 25 | 1,460 | 6.2 |
| 26 | 1,620 | 6.2 |
| 27 | 2,010 | 4.6 |
| 28 | 2,050 | 4.3 |
| 29 | 2,250 | 4.6 |

Examples 30–37

In these examples, tests are carried out to show the importance of the cobalt impregnation step of the present invention. Eight (8) electrodes are produced by impregnation with one of several different nitrate solutions, including lithium nitrate, nickel nitrate and cobalt nitrate, and oxidation for appropriate times at temperatures which produce approximately the same amount of oxide in each electrode. Two (2) of the electrodes are not impregnated, for comparative purposes. The particular impregnating agent used in each example, and its concentration, are set forth in table 4.

Each of the electrodes is tested for an 8-hour period in the same test cell, using the same anode. The cell is operated at 235° C. using an 85 percent by weight potassium hydroxide solution as the electrolyte. The anode and cathode of the cell are spaced ¼ inch apart.

The cells are operated at various voltage outputs, and the cell performance in amps/ft$^2$ of geometric electrode surface is measured to show comparative cell performance. The results of these tests are set forth in table 4. The results clearly show the superiority of the cobalt impregnating agent of the present process over the other agents tested.

TABLE 4

| Example number | Impregnating solution | Concentration, percent by weight | Current density, amps/ft.$^2$ at cell voltage | | |
|---|---|---|---|---|---|
| | | | 0.85 v. | 0.95 v. | 1.05 v. |
| 30 | None | | 246 | 145 | 59 |
| 31 | None | | 243 | 143 | 61 |
| 32 | LiNO$_3$ | 16 | 234 | 131 | 50 |
| 33 | LiNO$_3$ | 16 | 242 | 144 | 60 |
| 34 | Ni(NO$_3$)$_2$ | 20 | 245 | 155 | 65 |
| 35 | Ni(NO$_3$)$_2$ | 20 | 240 | 148 | 65 |
| 36 | Co(NO$_3$)$_2$ | 20 | 330 | 220 | 117 |
| 37 | Co(NO$_3$)$_2$ | 20 | 330 | 212 | 105 |

In determining current density in the preceding examples, the electrode surface area referred to is the geometric area, and the additional surface area afforded by the porosity of the electrodes is not taken into consideration in the computation of current density.

The invention in its broader aspects is not limited to the specific details shown and described, but departures may be made from such details within the scope of the accompanying claims without departing from the principles of the invention and without sacrificing it chief advantages.

What is claimed is:

1. A process for the producing of an oxidation resistant fuel cell electrode having highly stable operating characteristics, which comprises initially oxidizing a porous nickel electrode at a temperature of about 500 to 800° C. to produce a nickel oxide layer on the surface of the electrode, impregnating the oxidized electrode with a solution of a cobalt salt, and subsequently oxidizing the impregnated electrode at a temperature of about 250° to 550° C. to form a nickel oxide-cobalt oxide spinel-type surface on the electrode, both of said oxidation steps being carried out before insertion of the electrode into the fuel cell electrolyte.

2. The process of claim 1 in which the electrode is dried at a temperature of up to about 180° C. after the cobalt impregnation step and before oxidation of the impregnated electrode.

3. The process of claim 1 in which the initial oxidation step is carried out on a green, uncoated porous nickel electrode.

4. The process of claim 3 in which the cobalt salt is sued to impregnate the oxidized electrode is cobalt nitrate.

5. The process of claim 4 is which the initial oxidation step is carried out at a temperature of about 600° C. and the second oxidation step is carried out at a temperature of about 500° C.

6. The process of claim 3 in which the cobalt solution contains about 2 to 10 percent by weight of cobalt.

7. The process of claim 1 in which the porous nickel electrode is impregnated with a solution of lithium salt prior to the initial oxidation step.

8. The process of claim 7 in which the first oxidation step is carried out at about 650° C. and the second oxidation step is carried out at about 500° C.

9. The process of claim 7 in which the cobalt salt is used in the second impregnation step is cobalt nitrate.

10. The process of claim 7 in which the cobalt impregnating solution contains about 5 to 10 percent by weight of cobalt.

11. The process of claim 1 in which the porous nickel electrode is a biporous electrode.

12. An oxidation resistant and stable-operating porous nickel fuel cell electrode having a nickel oxide-cobalt oxide spinel-type surface produced by the process of claim 1.

13. An oxidation resistant and stable-operating biporous nickel fuel cell electrode having a nickel oxide-cobalt oxide spinel-type surface produced by the process of claim 11.

14. An intermediate temperature Bacon-type fuel cell comprising a housing, an alkaline electrolyte, an anode, and a porous nickel cathode having a nickel oxide-coblat oxide spinel-type surface produced by the process of claim 1.

UNITED STATES PATENT OFFICE
CERTIFICATE OF CORRECTION

Patent No. 3,607,416     Dated September 21, 1971

Inventor(s) John H. Sizer et al

It is certified that error appears in the above-identified patent and that said Letters Patent are hereby corrected as shown below:

Column 8, claim 4, line 74, "is sued" should be -- used --.

Column 9, claim 6, line 6, "2 to 10 percent" should be

-- 5 to 10 percent --;

Column 9, claim 9, line 13, after "salt" delete "is".

Signed and sealed this 7th day of March 1972.

(SEAL)
Attest:

EDWARD M. FLETCHER, JR.
Attesting Officer

ROBERT GOTTSCHALK
Commissioner of Patents